United States Patent [19]

Bradley, Jr.

[11] Patent Number: 4,701,020
[45] Date of Patent: Oct. 20, 1987

[54] REAR PROJECTION SCREEN WITH IMPROVED LUMINANCE UNIFORMITY

[75] Inventor: Ralph H. Bradley, Jr., Kingsport, Tenn.

[73] Assignee: North American Philips Consumer Electronics Corp., New York, N.Y.

[21] Appl. No.: 910,046

[22] Filed: Sep. 18, 1986

[51] Int. Cl.⁴ .............................................. G03B 21/60
[52] U.S. Cl. .................................................... 350/128
[58] Field of Search .......................... 350/128; 354/219

[56] References Cited

U.S. PATENT DOCUMENTS

| | | | |
|---|---|---|---|
| 4,054,907 | 10/1977 | Itoh et al. ..................... | 350/128 X |
| 4,147,408 | 4/1979 | Plummer ............................. | 350/128 |
| 4,374,609 | 2/1983 | Lange ................................ | 350/128 |
| 4,452,509 | 6/1984 | VanBreemen ....................... | 350/128 |
| 4,512,631 | 4/1985 | VanBreemen ....................... | 350/128 |
| 4,531,812 | 7/1985 | Oguino ............................... | 350/128 |
| 4,573,764 | 3/1986 | Bradley ............................... | 350/128 |

Primary Examiner—Richard A. Wintercorn
Attorney, Agent, or Firm—John C. Fox

[57] ABSTRACT

Color television rear projection screen having a front vertically oriented lenticular lens array, a circular Fresnel lens component with an infinite second conjugate, and a horizontally oriented linear Fresnel lens component with a finite second conjugate, the screen having improved luminance uniformity.

13 Claims, 3 Drawing Figures

REAR PROJECTION SCREEN WITH IMPROVED LUMINANCE UNIFORMITY

BACKGROUND OF THE INVENTION

This invention relates to rear projection screens for use in displaying an image projected from an image source. More particularly, the invention relates to a rear projection screen which utilizes a front lenticular lens array to distribute light from the image source, and a rear Fresnel lens to receive light from the image source and to collimate this light for the lenticular lens array.

Rear projection screens are used in a variety of applications, such as television, video games, film media displays, microfilm readers, radar and avionic displays, flight simulators and traffic control lights. In such applications, an image behind the screen is projected forward along a central projection axis to the screen, which displays the image to viewers located in front of the screen.

A problem encountered in these rear projection systems is that the light energy tends to be concentrated along the projection axis. This is particularly troublesome in those applications in which a room-sized audience is contemplated, such as, for example, projection television. In such cases, the angle of view will normally vary little in the vertical direction, but widely in the horizontal direction.

It is an objective of the screen designer to achieve uniform illumination of the screen, and also to distribute the screen image over as wide a horizontal viewing angle as possible.

In U.S. Pat. No. 4,573,764, assigned to the same Assignee as this Application, a rear projection screen is described which achieves a remarkably wide horizontal angle of view of greater than plus or minus 85° relative to the projection axis, with the luminance at any horizontal viewing angle being no less than 40 percent of the peak luminance. This is accomplished by combining a conventional light collimating circular Fresnel lens with a light distributing lenticular lens array in which the individual lenticular elements have critical design parameters including height-to-width and overall width-to-tip width ratios, as well as tip regions characterized by two lateral convex and central concave cylindrical elements, resulting in exceptional horizontal dispersion of light, while at the same time exhibiting minimal color shift.

Disperson of the light rays in the vertical direction is generall accomplished by diffusion means located between the light collimating Fresnel lens and the light spreading lenticular lens array. Such diffusion means also tends to reduce color shift by achieving a more even horizontal dispersion of the light rays.

In the case of projection television, it is usually not necessary to distribute the light through a large vertical included angle, since the individual vertical viewing angles within the audience typically vary only a few degrees from one another. On the other hand, it is advantageous to reduce the vertical included angle of the audience field as much as possible, since this angle is approximately inversely proportional to the screen gain, defined as the amount of front screen brightness (output) obtained for a given amount of rear screen illumination (input).

However, in a projection television system employing a wide angle screen of the type described, when the diffusion means is changed to reduce the vertical viewing angle, a bright band appears horizontally across the screen, becoming increasingly apparent as the vertical audience field is further reduced, and moving in tandem with vertical shifts in the viewer's head.

Accordingly, it is an object of the invention to reduce or eliminate this bright band from wide angle rear projection screens of the type described.

It is another object of the invention to improve the luminance uniformity of such rear projection screens.

It is another object of the invention to produce such a rear projection screen having a reduced vertical viewing angle.

It is still another object of the invention to increase screen gain without the onset of the bright band.

SUMMARY OF THE INVENTION

In accordance with the invention, a rear projection screen including a light spreading vertically oriented lenticular lens array, and a light collimating circular Fresnel lens component, having a finite first conjugate and an infinite second conjugate, exhibits improved luminance uniformity by the addition to the screen structure of a horizontally oriented linear Fresnel lens component having an infnte first conjugate and a finite second conjugate.

In accordance with a preferred embodiment of the invention, each lenticule of the lenticular lens array has a height-to-pitch ratio of at least 1:1 and a pitch-to-tip width ratio of at least 2:1, and a tip surface contiguous with the side portions, the tip surface comprising two outside convex cylindrical or flat portions, and a central concave cylindrical portion.

In accordance with another preferred embodiment, the screen is in two sections, a front section including the lenticular lens array on its front surface, and a rear section including a circular Fresnel lens, with the linear Fresnel lens located either on the rear surface of the front section, or on a surface of the rear section opposing the circular Fresnel lens surface.

DESCRIPTION OF THE PREFERRED EMBODIMENT

A color television projection system employing a wide angle viewing screen of the type claimed in U.S. Pat. No. 4,573,764 will now be briefly described. A more detailed description may be found in the patent, which is hereby incorporated by reference.

Figure 1:
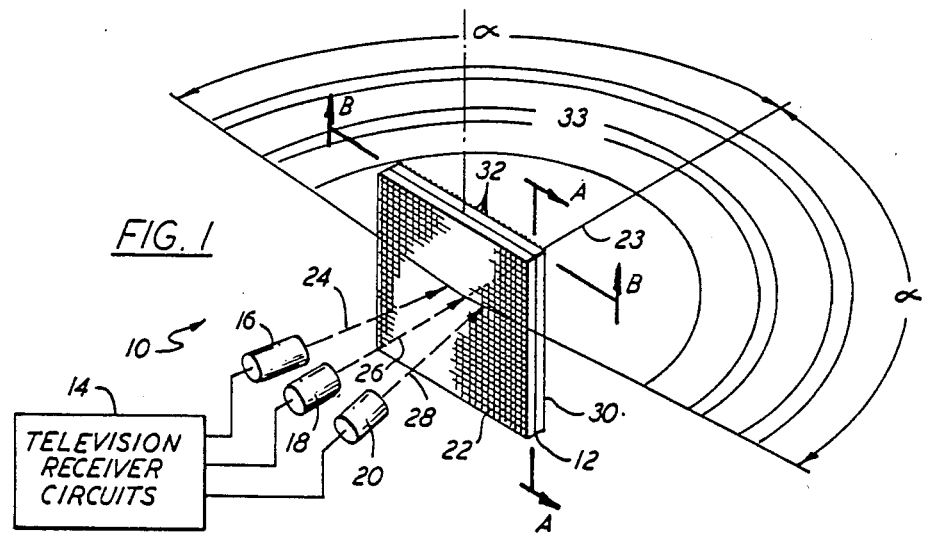
FIG. 1 is a perspective view of a rear projection color television system employing a preferred embodiment of a rear projection screen of the invention.

FIG. 1 illustrates a rear projection color television system 10 employing a rear projection screen 12. Video signals are received by television receiver circuits 14 and are projected through individual red, green and blue cathode ray tube (CRT)/lens projector assemblies 16, 18, and 20, onto the rear surface 22 of projection screen 12. The three CRT/lens projector assemblies 16, 18 and 20 each include a CRT and associated projection optics, and are arranged horizontally with respect to screen 12. The green assembly 18 is located so as to have its optical axis 26 coincide with the central projection axis, while the red and blue assemblies 16 and 20, having optical axes 24 and 28 respectively, are laterally and angularly offset from the green axis 26.

The rear section 22 of screen 12 includes a circular Fresnel lens with a finite first conjugate and an infinite second conjugate, (conjugate being defined as the distance of the location where the principal light rays converge from the Fresnel lens), for collimating the divergent light rays from the CRT projector assembly 18.

As used herein, the term "infinite" is meant to include the range of conjugates from minus 5 to plus 5 times the expected mean distance of the audience.

The front section 30 of screen 12 includes an array of closely-spaced vertically oriented and mutually parallel lenticular lens elements or lenticules 32, shaped to spread light horizontally through a wide viewing angle $\alpha$ in audience field 33.

Figure 2:
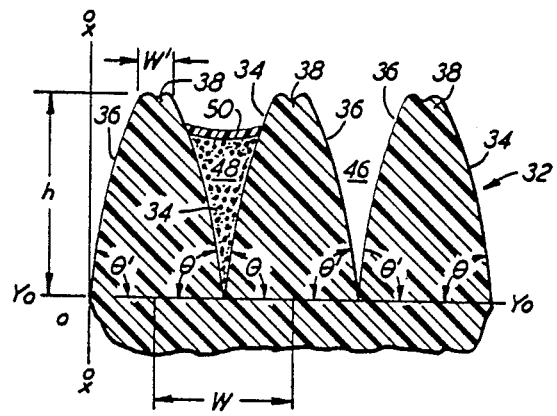
FIG. 2 is a cross-section view through line B—B of a portion of the lenticular array of FIG. 1.

FIG. 2, a cross-section of three of these lenticules, illustrates the preferred optical surface for wide angle viewing. Each lenticular lens element 32 has side surfaces 34 and 36 and an upper tip surface 38. The side surfaces 34 and 36 may be linear, but are preferably convexed outward, and have an average slope $\phi$ and $\phi'$ selected to establish a degree of internal reflection desired to direct light from a projection source to the upper tip surface 38. Tip surface 38 is of an undulating shape resulting from the juxtaposition of two outer convex cylindrical elements with a central concave cylindrical element.

The ratio of the width W' of the upper tip surface 38 to the width W of the lenticules herein, called pitch, must be at least 2:1, and preferably at least 3:1. The ratio of the lenticule height h to the pitch W must be at least 1:1, and is preferably at least 3:2.

Figure 3:
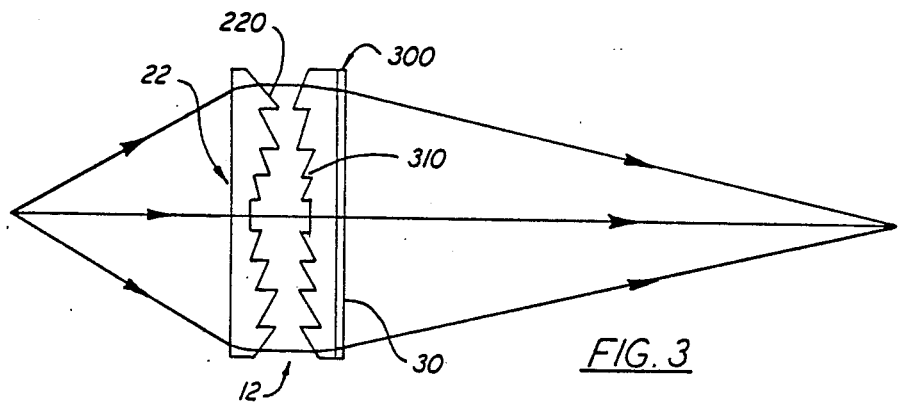
FIG. 3 is a cross-section view through line A—A of the front screen of FIG. 1 showing front and rear sections.

FIG. 3 is a cross-section view along line A—A of screen 12, showing rear section 22 having a conventional circular Fresnel lens 220 on the front surface thereof, and front section 30 having lenticular lens array 300 on the front surface thereof. In accordance with the teachings of the invention, a horizontally oriented linear Fresnel lens 310 is located behind the lenticular array 300, shown here on the rear surface of front section 30. This linear Fresnel lens has a finite second conjugate, preferably from about 5 to 30 feet in front of the lens surface, the specific value chosen to be in the range of one to three times the expected mean viewing distance in the audience field.

Such a horizontally oriented linear Fresnel lens has the effect of directing mean vertical rays to a position in front of the screen equal to the second conjugate of the Fresnel lens, thereby improving the overall luminance uniformity of the screen.

Alternative arrangements to the one depicted in FIG. 2 are possible, so long as the lenticular array remains in the foremost position. Thus, for example, the positions of the two Fresnel lenses may be interchanged, or both Fresnel lenss may be located on opposite surfaces of rear section 22. Where the lenticular lens array consists of two surfaces of registered or unregistered lenticular arrays, then it is preferred to locate the linear Fresnel lens behind the circular Fresnel lens, so that the projected light passes through the linear Fresnel lens first.

However, for single surface lenticular arrays, it is preferred to have the location of the linear Fresnel lens between the lenticular array and the circular Fresnel lens as depicted in FIG. 3, so that the projected light will pass first through the circular Fresnel lens, and to have the first conjugate of the linear Fresnel lens infinite, so that the light rays tend to concentrate at the second conjugate of the linear Fresnel lens.

The calculation of the riser angles for the facets of the linear Fresnel lens is identical to that for a conventional circular Fresnel lens with an infinite first conjugate, except that the facets will be linear instead of circular.

The linear Fresnel lens is typically designed for an infinite first conjugate and a second conjugate of about 15 feet to 8 feet. Using the ordinary equations for calculating Fresnel facet angles, preferably corrected for spherical aberration, this results in smaller facet angles for the linear than the conventional Fresnel lens, which is typically designed with a first conjugate of 30 to 60 inches and a second conjugate of infinity.

A very desirable feature of the preferred embodiment is that the linear Fresnel lens can have the same design for a variety of different screen sizes and is independent of the projection lens focal length and system magnification. This means that master replication tooling for the linear Fresnel lens does not have to be prepared for each projection screen to be produced.

Rear projection screens made in accordance with the present invention can be manufactured by various processes, including compression xolding, injection molding, extrusion, hot roller pressing, casting and photopolymerization processes. Such screens can be constructed of optically transparent or translucent solid materials such as inorganic glasses and a variety of plastics. In addition, the screen composition can also be a mixture of materials. A preferred material is polymethylmethacrylate.

As mentioned above, diffusion means are generally employed in such rear projection screens in order to increase the vertical distribution of light provided by the projection lenses. This diffusion can be effected by a bulk property of the refracting material from which the screen is constructed, or can be due to surface texturizing of any surface, preferably not the front lenticular surface, or can be a diffusion layer present in a composite laminate, or can be produced by some combination of these approaches. Typically, the diffusion means should increase the vertical audience field to between 8 degrees and 30 degrees, and preferably between 12 degrees and 22 degrees.

Audience field is herein conservatively defined as two times the angle between a point of maximum brightness and a point of one-half maximum brightness. In general, the smaller the vertical audience field, the greater the improvement in luminance uniformity effected by the linear Fresnel lens.

When using a lenticular array of the type depicted in FIG. 2, in combination with a conventional collimating circular Fresnel lens in a rear projection screen such as is depicted in FIG. 3, but without the linear Fresnel lens, attempts to increase screen gain by reducing the diffusion angle (and thereby reducing the vertical angle of view), are accompanied by an annoying bright horizontal band of light in the central area of the screen.

Use of the linear Fresnel lens in the manner described herein significantly reduces or eliminates this bright band, and thus enables the achievement of higher gains for these wide angle screens than previously attained.

This is due to the fact that a viewer whose eyes are at the vertical position of the mean rays through the center of the screen, and are also at a distance in front of the screen equal to the second conjugate of the linear Fresnel lens, will see a maximum luminance from all vertical portions of the screen simultaneously. Furthermore, if the viewer changes his vertical viewing position, then all portions of the screen will tend to change in brightness at the same rate. Finally, if the viewer moves his position towards or away from the screen, then he will experience a minimum change in brightness of different portions of the screen relative to the brightest portion of the screen for reasonable viewing distances, not just the distance equal to the second conjugate of the linear Fresnel lens. Consequently, the addition of the linear Fresnel lens improves the viewability of the display by substantially improving the luminance conformity of the displayed image to the ideal image.

As is known, the apparent contrast of images displayed on such rear projection screens may be enhanced by applying a light absorbing material, such as a so-called "black mask", between the lenticules to reduce reflected ambient light. Black masking of screen 12 is shown in FIG. 3, and can be accomplished by filling a substantial portion of the groove 46 between lenticles with black discreet particles 48 capable of absorbing visible light, and by containing said particles by means of a skin 50 which extends between the lenticular ribs 32 and over the groove 46. Such a black mask construction is described in U.S. Pat. No. 4,605,283, issued Aug. 12, 1986.

By calculating top and bottom screen brightnesses at various viewing distances, with and without the linear Fresnel lens, and comparing the results, reduced bright banding is indicated. Such a comparison was carried out for a 46 inch projection television system, for 16 degrees of vertical audience field. The calculations are for a viewer whose eyes are at the vertical height to observe maximum center screen brightness. The numbers in the Tables are calculated for a screen height to width ratio of 3:4, having a screen height of 27.6", and in which the vertical luminance distribution as a function of the vertical viewing angle is gaussian. Results are shown in Tables I and II, listing the average of the top and bottom screen brightnesses calculated at various viewing distances relative to center screen brightness (an indication of luminance uniformity) from 2 to 14 feet.

TABLE I

46 INCH PTV SCREEN (DIAGONAL MEASURE) NO LINEAR FRESNEL

| Viewing Distance | Screen Top/Bottom Gain Relative to Center Gain |
|---|---|
| 2 | 0.006 |
| 4 | 0.229 |
| 6 | 0.510 |
| 8 | 0.682 |
| 10 | 0.782 |
| 12 | 0.843 |
| 14 | 0.882 |

TABLE II

46 INCH PTV SCREEN (DIAGONAL MEASURE) LINEAR FRESNEL: FOCAL LENGTH = 10 FEET

| Viewing Distance | Screen Top/Bottom Gain Relative to Center Gain |
|---|---|
| 2 | 0.044 |
| 4 | 0.598 |
| 6 | 0.900 |
| 8 | 0.985 |
| 10 | 1.000 |
| 12 | 0.993 |

TABLE II-continued

46 INCH PTV SCREEN (DIAGONAL MEASURE) LINEAR FRESNEL: FOCAL LENGTH = 10 FEET

| Viewing Distance | Screen Top/Bottom Gain Relative to Center Gain |
|---|---|
| 14 | 0.980 |

As can be seen from the Tables, luminance uniformity is increased by 11 percent at 14 feet to over 700 percent at 2 feet by the addition of the linear Fresnel lens to the projection screen.

The addition of the horizontal linear Fresnel lens has the following effect. As far as the horizontal distribution of rays by the screen are involved, the screen will behave as though it had a conventional circular Fresnel lens with the second conjugate equal to infinity; but as far as the vertical distribution is involved, the screen will behave as though it had a conventional circular Fresnel lens with a finite second conjugate.

The horizontal linear Fresnel lens is especially appropriate for use with any screen utilizing a vertical lenticular array in which the shape of the lenticules is not a function of their horizontal distance from the center of the screen, because such an array can function optimally for all horizontal positions on the screen.

A different way to accomplish the purpose of the present invention is to design a single surface compound Fresnel lens such that the riser angle of individual facets in the lens vary as a function of the azimuthal angle, leading to a Fresnel lens which has different conjugates in the vertical and horizontal cross sections. This can be accomplished by using a cutting apparatus in which a cam device has been incorporated. The cam need only alter the angle at which the cutting tool is held as a function of azimuthal angle. This approach can produce Fresnel lenses with equally spaced facets, that is, constant facet pitch. The performance of this compound Fresnel lens would be exactly correct for vertical and horizontal cross-sections through the center of the Fresnel lens, and would be better for general azimuthal angles than the use of only a conventional circular Fresnel lens with infinite second conjugate.

The single compound Fresnel lens approach is particularly attractive for use with a one piece screen. Such one-piece screen construction enjoys the advantages of improved contrast, and mechanical stability.

Some additional variations of the invention have been considered. For example, hybrid lens arrays, in which curvature is added to the cross section of facet surfaces of the horizontal linear Fresnel lens can function to cause some spreading of principal rays into a controlled range of angles, thereby enabling precise control of the vertical audience field.

Another enhancement of the invention, is to shift the "center" of the linear Fresnel lens vertically, in order to elevate or otherwise optimize the mean direction of light from the projection display screen. Because of the relatively low optical power required of the linear Fresnel lens as compared to a conventional circular Fresnel lens, and the fact that the lens has optical power only in the vertical cross section, shifting the linear Fresnel lens will cause relatively minor losses of efficiency.

As is known, another means for elevating the mean direction of light from the screen is a segmented prism.

Finally, if the circular Fresnel lens is designed such that the projected light passing through it is converging (that is, the second conjugate is a finite distance in the audience space), then a vertical linear Fresnel with negative power could correct the angles in horizontal cross sections to become normal to the vertical lenticular array.

What is claimed is:

1. Color television rear projection screen having a circular Fresnel lens component with an infinite second conjugate, for collimating the light from a projected image, and a front vertically oriented lenticular lens array, for spreading the collimated light horizontally in an audience field; characterized by also having a horizontally oriented linear Fresnel lens component with a finite second conjugate, whereby the screen exhibits improved luminance uniformity.

2. The screen of claim 1 in which the lenticular lens array comprises mutually parallel sequentially adjacent lenticular lens elements extending the entire vertical length of the screen and separated horizontally from one another by a predetermined distance designated the pitch.

3. The screen of claim 2 in which each lenticule has a tip surface comprising two side convex cylindrical or flat portions and a central concave cylindrical portion, a height to pitch ratio of at least 1:1 and a pitch to tip width ratio of at least 2:1.

4. The screen of claim 1 comprising two sections, a front section and a rear section, each section having a front and rear surface: the vertically oriented lenticular lens array located on the front surface of the front section; the circular Fresnel lens located on a surface of the rear section; and the linear Fresnel lens located to the rear of the lenticular lens array on one of the remaining surfaces.

5. The screen of claim 4 in which the linear Fresnel lens is positioned between the lenticular lens array and the circular Fresnel lens.

6. The screen of claim 5 in which the linear Fresnel lens is located on the rear surface of the front section.

7. The screen of claim 5 in which the linear Fresnel lens has an infinite first conjugate and a second conjugate within the range of about 5 to 30 feet.

8. The screen of claim 1 which additionally comprises optical diffusion means.

9. The screen of claim 2 in which the lenticular lens array includes light absorbing means in the spaces between adjacent lens elements.

10. The screen of claim 1 which additionally comprises means for elevating the mean direction of light radiating from the screen.

11. The screen of claim 10 in which the means comprises a segmented prism.

12. The screen of claim 1 in which the circular and linear Fresnel lens components are combined into a single Fresnel lens having a compound surface, whereby the second conjugate of the compound lens varies from finite in the vertical direction to infinite in the horizontal direction.

13. The screen of claim 12 in which the compound Fresnel lens has a minimum second conjugate within the range of about 5 to 30 feet.

* * * * *